(12) United States Patent
Lykken et al.

(10) Patent No.: US 6,213,490 B1
(45) Date of Patent: Apr. 10, 2001

(54) WORK VEHICLE WITH NESTED STEERING

(75) Inventors: Thomas G. Lykken; Brian D. Vik; Timothy J. Bock, all of Fargo, ND (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/293,321

(22) Filed: Apr. 16, 1999

Related U.S. Application Data

(63) Continuation-in-part of application No. 09/160,669, filed on Sep. 25, 1998.

(51) Int. Cl.$^7$ .............................. B62D 13/00; B62D 35/00
(52) U.S. Cl. ...................... 280/442; 280/492; 180/9.46; 180/89.13; 180/235
(58) Field of Search ........................ 180/9.1, 9.46, 180/9.44, 9, 14.1–14.4, 14.7, 418–420, 89.13, 235; 280/442, 492, 98, 100

(56) References Cited

U.S. PATENT DOCUMENTS

| | | | |
|---|---|---|---|
| 3,367,437 | * 2/1968 | Garrett | 180/238 |
| 3,741,331 | * 6/1973 | Kowalik | 180/9.44 |
| 3,783,963 | 1/1974 | Erwin . | |
| 3,789,942 | * 2/1974 | Kowalik | 180/9.44 |
| 3,826,388 | * 7/1974 | Oldenburg et al. | 180/9.44 |
| 4,043,422 | * 8/1977 | Barrett et al. | 180/418 |
| 5,154,439 | 10/1992 | Weyer . | |
| 5,222,574 | 6/1993 | Miller . | |
| 5,234,069 | 8/1993 | Krone et al. . | |
| 5,269,389 | 12/1993 | Tomiyoshi et al. . | |
| 5,366,337 | * 11/1994 | Eriksson | 414/550 |
| 5,452,949 | * 9/1995 | Kelderman | 180/9.44 |
| 5,533,587 | 7/1996 | Dow et al. . | |
| 5,632,350 | 5/1997 | Gauvin . | |
| 5,924,503 | * 7/1999 | Lykken | 180/9.44 |
| 6,016,885 | * 1/2000 | Hickman et al. | 180/418 |

* cited by examiner

Primary Examiner—Brian L. Johnson
Assistant Examiner—Matthew Luby
(74) Attorney, Agent, or Firm—Foley & Lardner

(57) ABSTRACT

An agricultural tractor with four ground contacting suspensions, two front and two rear disposed on opposite sides of the vehicle can be steered such that its front suspension lies behind its rear suspension. The front suspension can pivot about an articulation joint in the vehicle and also about a wheel-end steering joint such that when it is in an extreme left or right turn position, the front suspension cannot be turned about the wheel-end steering joint while holding the articulation joint in an extreme left or right turn position without causing the front suspension to interfere with and contact the rear suspension.

22 Claims, 3 Drawing Sheets

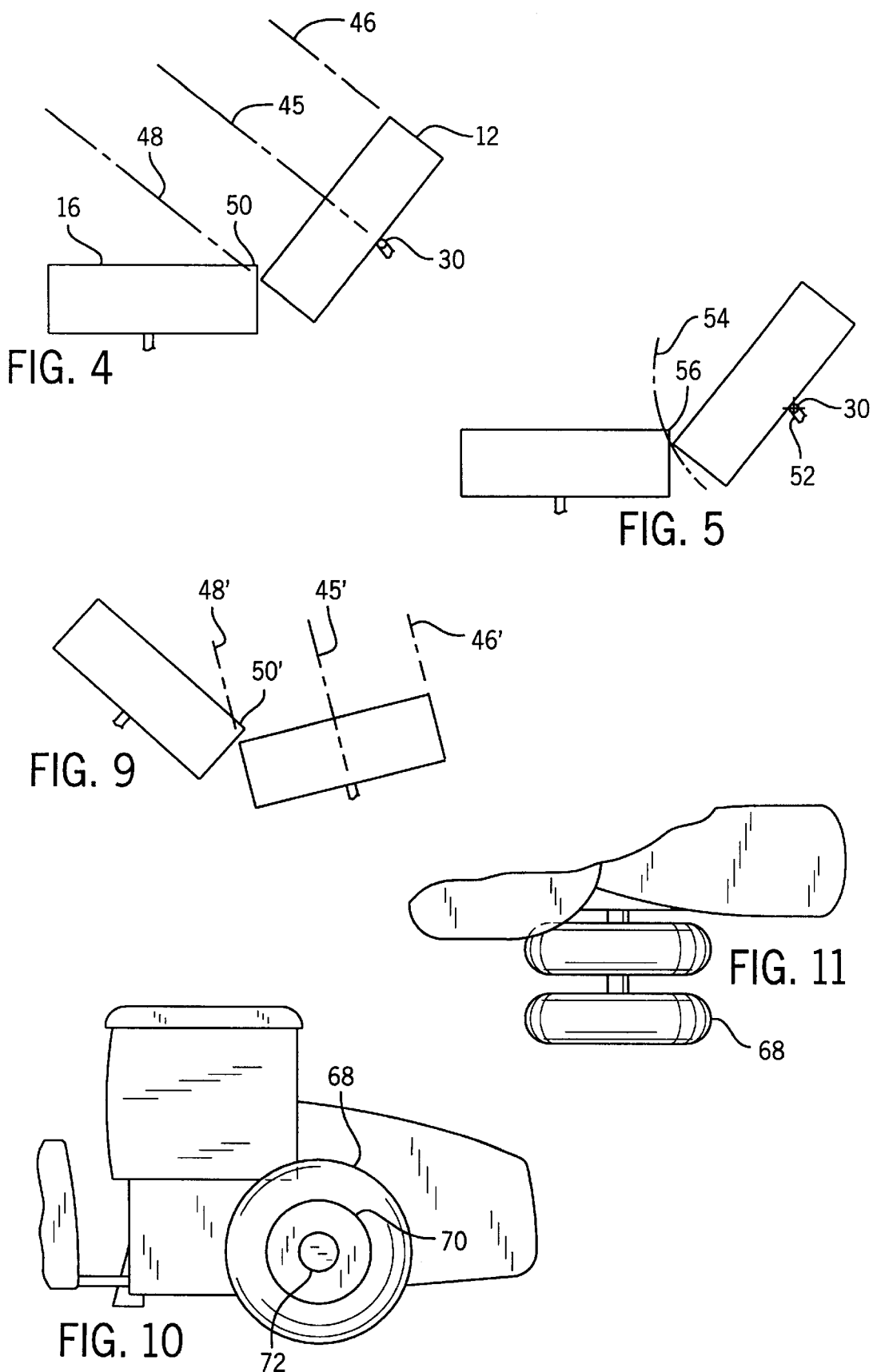

WORK VEHICLE WITH NESTED STEERING

REFERENCE TO RELATED APPLICATION

This is a continuation-in-part of application Ser. No. 09/160,669, filed Sep. 25, 1998. This Application claims priority from application Ser. No. 09/160,669 under 35 U.S.C. § 120.

FIELD OF THE INVENTION

The invention relates to articulated work vehicles for agricultural use. More particularly it relates to such vehicles with dual steering permitting the front suspension to be nested within the rear suspension.

BACKGROUND OF THE INVENTION

Work vehicles for agricultural use need the capacity both to pull large loads and the ability to turn in a small radius. Agricultural tractors require high load-pulling capacity since they often tow heavy implements over rough terrain such as plows, harrows, fertilizer carts and others. At the same time, they require a tight turning radius since the implements towed are typically used for cultivating fields, and thus must make tight turns at the end of the field to permit the cultivation of adjacent rows.

To provide for ever increasing load-pulling requirements, tractor manufacturers have historically increased tire diameters (for wheeled vehicles) or the length of track contacting the ground (for tracked vehicles). Increasing wheel diameter or track length is limited in many current tractor designs, however. Increasing diameter or length in tractors that employ wheel end or wagon-type steering only will cause the wheel or track to hit the sides of the vehicle when turned, thus requiring the allowable steering angle to be reduced. To avoid this problem, tractor manufacturers previously moved to articulated vehicles that have a front and rear frame and are steered by pivoting about an articulation joint in the middle of the vehicle.

The use of purely articulated vehicles solved the problem temporarily, but articulated vehicles had additional problems that appeared when wheel and track size increased to provide additional load-pulling capacity. Since the hinge or pivot points for articulated tractors were typically disposed in the center of the vehicle, enlarged wheels and tracks caused the trailing surfaces of the front wheel or track and the leading surfaces of the rear wheel or track to touch when the vehicles were steered.

To prevent this interference yet maintain a small turning radius, tractor manufacturers developed vehicles having a combination of articulation steering and wheel-end steering. The degree of articulation was reduced from the previous generation to prevent wheel-to-wheel interference, thus increasing the effective turning radius. The turning radius was reduced, however, by reintroducing wheel-end steering. By combining an articulation joint with a reduced steering angle and a wheel-end steering to compensate, increased wheel and track sizes could be provided while keeping the same turning radius. Another approach was to provide a vehicle with two articulation joints disposed longitudinally along the centerline of the vehicle, thereby splitting the vehicle into three longitudinal sections.

The solution that combined wheel-end and articulated steering and the solution using double articulated steering have been outgrown, and proposed new designs again face the problems of interference between the front and rear wheels and tracks. To provide more load-pulling power, vehicles with wider tracks or a pair of large wheels on each side of the tractor ("duals") both front and rear have been proposed. These vehicles, due to their increased width, larger tracks or larger wheels again present the problem of wheel-to-wheel or track-to-track interference in tight turns. What is needed therefore is a new steering arrangement for agricultural tractors that will permit increased wheel sizes, vehicle width and track width yet not adversely affect turning radius. It is an object of the present invention to provide such an arrangement.

SUMMARY OF THE PRESENT INVENTION

A work vehicle is disclosed having front and rear suspensions that permit a front wheel or track to be nested behind a rear wheel or track disposed on the same side of the vehicle, to permit tighter turning of the vehicle and reduced interference between the front and rear wheels or tracks. The vehicle can be provided with a plurality of steering joints such that a rear steering joint must be straightened before a front steering joint may be straightened.

Other principal features and advantages of the invention will become apparent to those skilled in the art upon review of the following drawings, the detailed description and the appended claims.

BRIEF DESCRIPTION OF THE DRAWINGS

FIG. 4 is a schematic representation of the left side suspensions of FIG. 3 showing how the front suspension is behind the rear suspension;

FIG. 5 is a schematic representation of the left side suspensions of FIG. 3 showing how the front suspension will interfere with the rear suspension if it is pivoted about the wheel-end steering joint of the front suspension without first straightening the vehicle articulation joint;

FIG. 9 is a schematic representation of the left side suspensions of the tractor of FIG. 8 illustrating how the front suspension is behind the rear suspension; and FIGS. 10 and 11 are side and cross-sectional views of a wheeled suspension that can be substituted for the front and rear suspensions of FIGS. 1–9.

Figure 1:
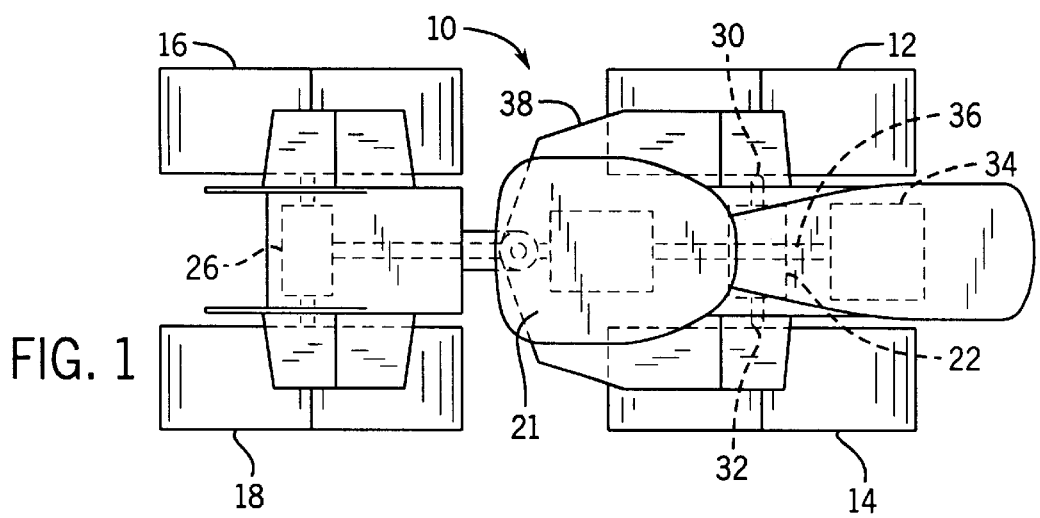
FIG. 1 is a top view of an agricultural tractor in accordance with the present invention.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Figure 2:
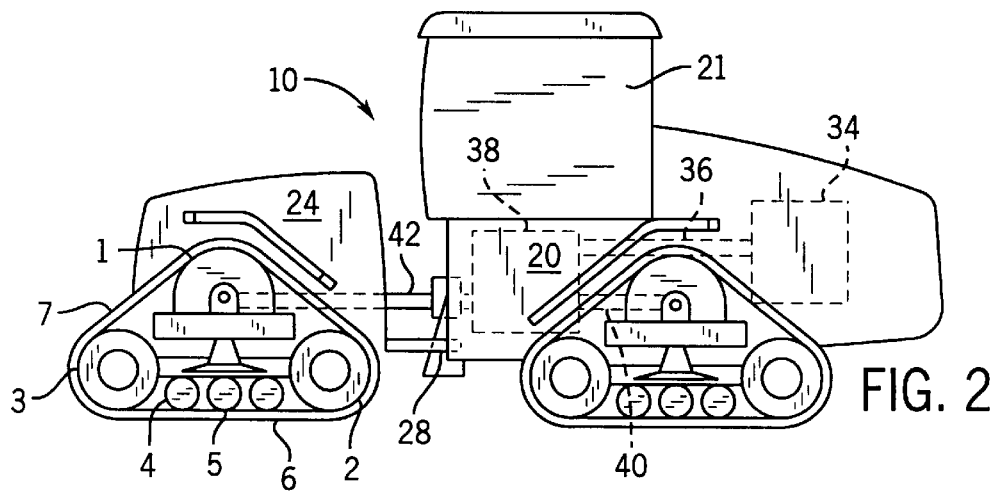
FIG. 2 is a side view of the tractor of FIG. 1.
Figure 3:
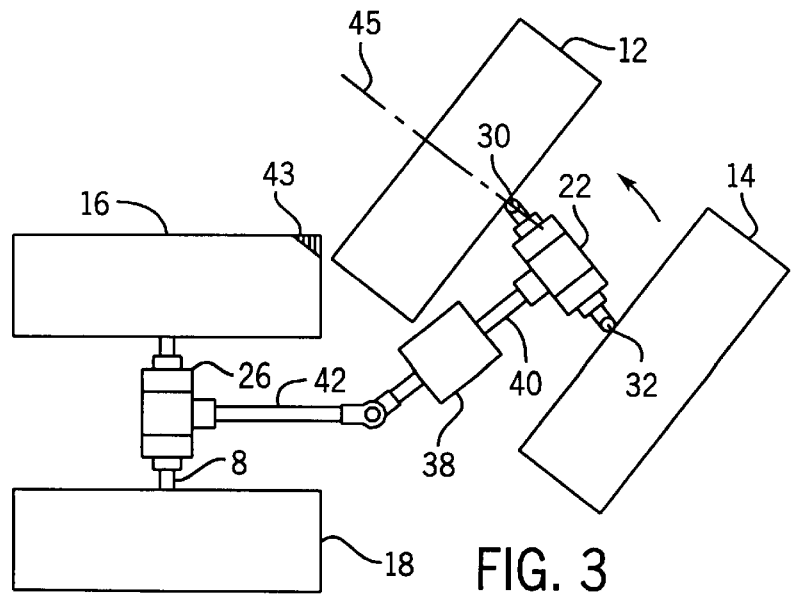
FIG. 3 is a top view of the tractor of FIGS. 1 and 2 showing that tractor in an extreme left turn with the frame, engine and engine drive shaft removed for clarity.

Referring to FIGS. 1—3, an agricultural tractor 10 is shown steering straight ahead, having two front suspensions 12, 14 and two rear suspensions 16, 18. Front suspensions 12, 14 are coupled to front frame 20 and are driven by front differential 22. Operator station, shown as cab 21, is supported by front frame 20 and faces in a forward direction. Rear suspensions 16, 18 are coupled to rear frame 24 and are driven by rear differential 26. Each of the four suspensions (only the right rear is numbered for convenience) is a tracked suspension including a drive wheel 1, two idler wheels 2 and 3 and three roller wheels 4, 5 and 6. An endless ground-engaging track 7 is disposed about these wheels and is driven by drive wheel 1. Each drive wheel 1, in turn is rotationally coupled to and driven by a driveshaft 8 extending from the differentials. Front frame 20 and rear frame 24 are coupled together by articulation joint 28, which permits the front and the rear frame to pivot with respect to each other substantially in a horizontal plane and which permit front frame 20 to be steered with respect to rear frame 24. Front suspensions 12, 14 are coupled to front frame 20 by wheel-end steering joints 30, 32, respectively, which permit front suspensions 12, 14 to be steered with respect to front frame 20.

Engine 34 provides motive power for the vehicle, and is mounted to front frame 20. Engine 34 drives driveshaft 36 which is rotationally coupled to and drives transmission 38. Transmission 38 is mounted to front frame 20. Transmission 38 drives front differential 22 via front driveshaft 40 which is rotationally coupled to both transmission 38 and front differential 22. Front differential 22, in turn, is rotationally coupled to front suspensions 12, 14 and drives them, causing the front suspensions to move vehicle 10. Transmission 38 also drives rear driveshaft 42, which is rotationally coupled to both transmission 38 and rear differential 26 and drives rear differential 26. Rear differential 26, in turn, is rotationally coupled to and drives rear suspensions 16 and 18, causing the rear suspensions to move the vehicle.

Front suspensions 12, 14 are steered by actuators (not shown) which cause the front suspensions to steer both left and right with respect to a straight ahead position. The front suspensions preferably can steer 4 degrees both to the right and to the left of the straight ahead position. More preferably, the front suspensions can steer 12 degrees both to the right and to the left with respect to the straight ahead position.

Front frame 20 is steered by actuators (not shown) which cause the front frame 20 to steer both left and right with respect to a straight ahead position about the articulation joint 28. The front frame 20 preferably can steer 30 degrees both to the right and to the left with respect to the rear frame 24. More preferably, the front frame 20 can steer 45 degrees both to the right and to the left with respect to the rear frame 24.

In FIG. 3, the front suspensions 12, 14 are shown turned to the left as far as possible with respect to the rear frame 24. In this position, front suspension 12 is nested "behind" rear suspension 16. The cross hatched area 43 of rear suspension 16 indicates that portion of rear suspension 16 that front suspension 12 is behind. To determine the degree to which the front suspension 12 is nested behind rear suspension 16, front suspension 12 is projected outward away from the vehicle in a direction parallel to the rotational axis 45 of the drive wheel of front suspension 12. If any ground contacting portion of a front suspension would intersect the rear suspension when projected outward in this manner, the front suspension can be said to be nested "behind" the rear suspension.

In FIG. 4, which shows front and rear suspensions 12 and 16 projection lines 46 and 48 are shown projecting outward from the forwardmost and rearmost edges (respectively) of the track or portion of front suspension 12 in a direction parallel to the rotational axis 45 of the drive wheel of front suspension 12. At point 50, the rear projection line 48 intersects rear suspension 16, and therefore front suspension 12 is nested behind rear suspension 16.

Tractor 10 of FIGS. 3–5 has been steered into an extreme left-turn position in which steering joint 30 is in a position and the articulation joint 28 is in a position such that steering joint 30 cannot be straightened with the articulation joint remaining in its illustrated position without causing front suspension 12 to contact rear suspension 16. Therefore, the front and rear suspensions have been constructed, the steering joints and the articulation joint selected, and the steering angles of each chosen such that the front and rear suspensions interfere with each other. This interference permits even closer spacing of the front and rear suspensions, and consequently limits the steerability of the vehicle, but beneficially provides a smaller turning radius.

The interference between the front and rear suspensions is graphically illustrated in FIG. 5 which schematically shows front suspension 12 and rear suspension 16. Front steering joint 30 defines a pivot point 52 that defines the theoretical arc 54 through which an outermost extent of front suspension 12 would rotate if it were permitted to do so by the vehicle's actuators. Arc 54 is shown extending from a rear portion of the ground-engaging portion (e.g. the track) of front suspension 12. If, in this position, the front suspension 12 were pivoted about steering joint 30 it would sweep through arc 54. Arc 54, however, would intersect the ground-engaging portion of rear suspension 16 at interference point 56, thus indicating that the ground-engaging portions of front and rear suspensions 12 and 16 would interfere, and therefore contact each other. For this reason, in order to steer the vehicle into a straight-ahead position, the articulation joint 28 must first be steered to the right, straightening out the vehicle, until the front suspension will clear the rear suspension when the steering joint 30 is steered to the right.

Figure 6:
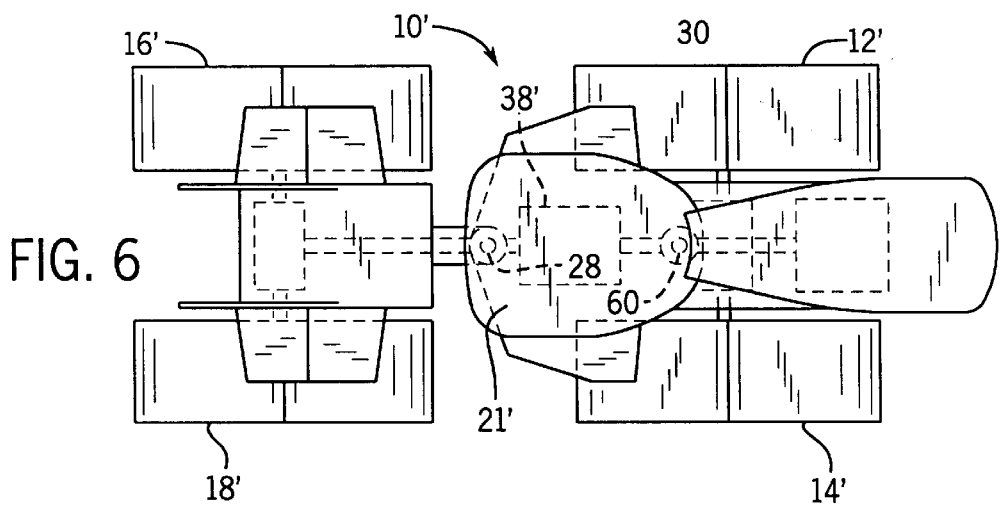
FIG. 6 is a top view of a second embodiment of an agricultural tractor in accordance with the present invention.
Figure 7:
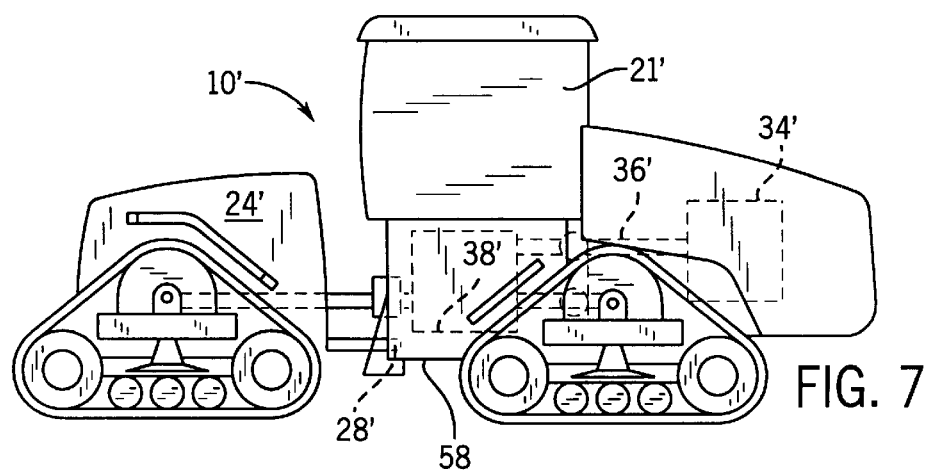
FIG. 7 is a side view of the tractor of FIG. 6.
Figure 8:
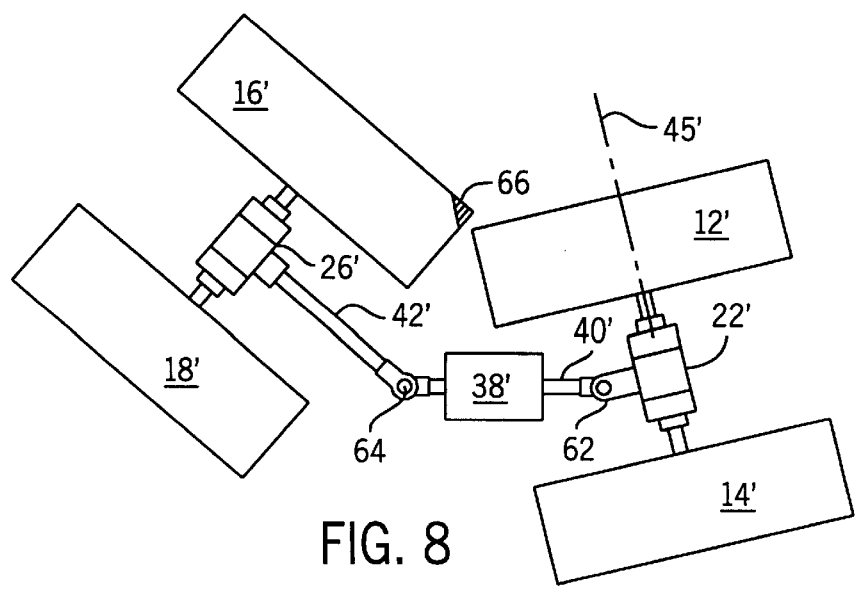
FIG. 8 if a top view of the tractor of FIGS. 6 and 7 in a hard left turn position with the frame, engine and engine drive shaft removed for clarity.

Referring to FIGS. 6–8, an agricultural tractor 10' is shown, having two front suspensions 12', 14' and two rear suspensions 16', 18'. This embodiment differs from the embodiment of FIGS. 1–5 in that it eliminates the wheel-end steering joints and employs a second articulation joint 28" place to provide the wide steering range. Front suspensions 12', 14' are coupled to front frame 20' and are driven by front differential 22'. Rear suspensions 16', 18' are coupled to rear frame 24' and are driven by rear differential 26'. A middle frame 58 is shown coupled between front frame 20' and rear frame 24'. Operator station, shown as cab 21', is supported by middle frame 58 and faces front frame 20'. Front frame 20' and middle frame 58 are coupled together by articulation joint 60, which permits the front and the middle frame to pivot with respect to each other in a substantially horizontal lane and which permit front frame 20' to be steered with respect to middle frame 58. Middle frame 58 and rear frame 24' are coupled together by articulation joint 28', which permits the middle and the rear frame to pivot with respect to each other in a substantially horizontal plane and which permit middle frame 58 to be steered with respect to rear frame 24'.

Engine 34' provides motive power for the vehicle, and is mounted to front frame 20'. Engine 34' drives driveshaft 36' which is rotationally coupled to and drives transmission 38'. Transmission 38' is mounted to middle frame 58. Since engine 34' is mounted to front frame 20' and transmission 38' is mounted to middle frame 58' a flexible coupling is disposed in driveshaft 36' to permit engine 34' and transmission 38' to pivot with respect to each other when front frame 20' and middle frame 58 pivot with respect to each other. Transmission 38' drives front differential 22' via front driveshaft 40' which is rotationally coupled to both transmission 38' and front differential 22'. Since front differential 22' is mounted to front frame 20' and transmission 38' is mounted to middle frame 58, a flexible coupling 62 is provided in front driveshaft 40' to permit transmission 38' and front differential 22' to pivot with respect to each other when middle frame 58 and front frame 20' are pivoted with respect to each other. Front differential 22', in turn, is rotationally coupled to front suspensions 12', 14' and drives them, causing the front suspensions to move vehicle 10'.

Transmission 38' also drives rear driveshaft 42', which is rotationally coupled to both transmission 38' and rear differential 26' and drives rear differential 26'. Rear differential 26', in turn, is rotationally coupled to and drives rear suspensions 16' and 18', causing the rear suspensions to move the vehicle. Since rear differential 26' is mounted to rear frame 24' and transmission 38' is mounted to middle frame 58, a flexible coupling 64 is provided in rear driveshaft 42' to permit rear differential 26' to pivot with respect to transmission 38' when middle frame 58 and rear frame 24' pivot with respect to each other.

Front frame 20' is steered with respect to middle frame 58 by actuators (not shown) which cause front frame 20' to steer both left and right with respect to a straight ahead position. Front frame 20' preferably can steer 5 degrees both to the right and to the left with respect to the middle frame 58. More preferably, front frame 20' can steer 20 degrees both to the right and to the left with respect to middle frame 58.

Middle frame 58 is steered with respect to rear frame 24' by actuators (not shown) which cause the middle frame 58 to steer both left and right with respect to a straight ahead position. Middle frame 58 preferably can steer 30 degrees both to the right and to the left with respect to the rear frame 24'. More preferably, middle frame 58 can steer 45 degrees both to the right and to the left with respect to rear frame 24'. 10 In FIG. 8, front suspensions 12', 14' are shown turned to the left as far as possible with respect to the rear frame 24'. In this position, front suspension 12' is nested behind rear suspension 16'. The cross hatched area 66 of rear suspension 16' indicates that portion of rear suspension 16' that front suspension 12' is behind. To determine the degree to which the front suspension 12' is nested behind rear suspension 16', front suspension 12' may be projected outward away from tractor 10' in a direction parallel to the rotational axis 45' of the drive wheel front suspension 12'.

As an example, in FIG. 9 which shows the front and rear suspensions 12', 16' of tractor 10' of FIG. 8 projection lines 46' and 48' are shown projecting outward from the forwardmost and rearmost portions (respectively) of the ground-contacting portion of front suspension 12' in a direction parallel to the rotational axis 45' of front suspension 12'. At point 50', the rear projection line 48' intersects rear suspension 16', and therefore front suspension 12 is nested behind rear suspension 16.

Front and rear suspensions 12, 14, 16, 18, 12', 14', 16', 18' may include ground contacting tracks or ground contacting wheels. In FIGS. 10 and 11 for example, a typical wheeled suspension is shown, comprising a ground-engaging tire 68 mounted on a rim 70 that in turn is coupled to hub 72. The wheels may be duals, such as those shown in FIG. 11. While only a single tracked suspension, the right rear suspension, was described in conjunction with FIG. 2, the same suspension is preferred for all four suspensions of the embodiments of FIGS. 1–9.

In the embodiments above, the tractor is shown steered in a straight-ahead position and in a hard left turn position for illustration. It may also be turned to the right just as it is shown turning to the left and with the same "behind" and "interfering" relationships between front and rear suspensions in a right turn position.

Thus, it should be apparent that there has been provided in accordance with the present invention a work vehicle with nested steering that fully satisfies the objectives and advantages set forth above. Although the invention has been described in conjunction with specific embodiments thereof, it is evidence that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. An agricultural tractor comprising:
   a front frame;
   an operator station facing the front frame;
   first and second front ground-engaging suspensions coupled to the front frame and disposed on laterally opposing sides of the vehicle;
   first and second steering joints disposed between the front frame and the first and second front ground engaging suspensions respectively to permit steering of the first and second front ground-engaging suspensions with respect to the front frame;
   a rear frame;
   first and second rear ground-engaging suspensions coupled to the rear frame and disposed on laterally opposing sides of the vehicle;
   an articulation joint coupling the front frame to the rear frame to permit steering of the front frame with respect to the rear frame;
   wherein the articulation joint and the first and second steering joints are disposed to steer the first and second front ground-engaging suspensions into a position such that one of the front ground-engaging suspensions is nested behind one of the first and second rear ground-engaging suspensions respectively.

2. The agricultural tractor of claim 1 wherein the first and second steering joints permit the first and second front ground-engaging suspensions respectively to be pivoted through a range of 4 degrees with respect to the front frame, and wherein the articulation joint permits the rear frame to be pivoted through a range of 30 degrees with respect to the front frame.

3. The agricultural tractor of claim 2 wherein the first and second steering joints permit the first and second front ground-engaging suspensions respectively to be pivoted through a range of 12 degrees with respect to the front frame, and wherein the articulation joint permits the rear frame to be pivoted through a range of 45 degrees with respect to the front frame.

4. The agricultural tractor of claim 1, wherein the vehicle is steerable into a first steered position in which the first steering joint is in a first pivoted position and the articulation joint is in a second pivoted position and wherein the first steering joint cannot be straightened from said first pivoted position while the articulation joint is in the second pivoted position without causing the first front ground-engaging suspension to contact the first rear ground-engaging suspension.

5. The agricultural tractor of claim 1, wherein the first and second front and rear suspensions each includes a plurality of wheels and an endless track disposed to rotate around the plurality of wheels.

6. The agricultural tractor of claim 5 wherein the plurality of wheels includes two idler wheels, a drive wheel disposed above and between the two idler wheels and a plurality of roller wheels disposed between the two idler wheels.

7. The agricultural tractor of claim 1, wherein the operator station is a cab.

8. The agricultural tractor of claim 1, further including an engine mounted to the front frame.

9. The agricultural tractor of claim 1, further including a transmission mounted to the front frame.

10. The agricultural tractor of claim 9, wherein the first and second front ground-engaging suspensions are driven by the transmission.

11. The agricultural tractor of claim 9, wherein the first and second rear ground-engaging suspensions are driven by the transmission.

12. An agricultural tractor comprising:
a front frame;
first and second front ground-engaging suspensions coupled to the front frame and disposed on laterally opposing sides of the vehicle;
a middle frame coupled to the front frame;
an operator station facing the front frame;
a front articulation joint coupled between the front frame and the middle frame to permit steering of the front frame with respect to the middle frame;
a rear frame;
first and second rear ground-engaging suspensions coupled to the rear frame and disposed on laterally opposing sides of the vehicle;
a rear articulation joint coupling the middle frame to the rear frame to permit steering of the middle frame with respect to the rear frame;
wherein the front and rear articulation joints are disposed to steer the first and second front ground-engaging suspensions into a position such that one of the front ground-engaging suspensions is nested behind one of the first and second rear ground-engaging suspensions.

13. The agricultural tractor of claim 12, wherein the front articulation joint permits the first and second front ground-engaging suspensions respectively to be pivoted through a range of 5 degrees with respect to the middle frame, and wherein the rear articulation joint permits the rear frame to be pivoted through a range of 30 degrees with respect to the middle frame.

14. The agricultural tractor of claim 13, wherein the front articulation joint permits the first and second front ground-engaging suspensions respectively to be pivoted through a range of 20 degrees with respect to the middle frame, and wherein the rear articulation joint permits the rear frame to be pivoted through a range of 45 degrees with respect to the middle frame.

15. The agricultural tractor of claim 12, wherein the vehicle is steerable into a first steered position in which the front articulation joint is in a first pivoted position and the rear articulation joint is in a second pivoted position and wherein the front articulation joint cannot be straightened from said first pivoted position while the rear articulation joint is in the second pivoted position without causing the first front ground engaging suspension to contact the first rear ground-engaging suspension.

16. The agricultural tractor of claim 12, wherein the first and second front and rear suspensions each includes a plurality of wheels and an endless track disposed to rotate around the plurality of wheels.

17. The agricultural tractor of claim 16, wherein the plurality of wheels includes two idler wheels, a drive wheel disposed above and between the two idler wheels and a plurality of roller wheels disposed between the two idler wheels.

18. The agricultural tractor of claim 12, wherein the operator station is a cab.

19. The agricultural tractor of claim 12, further including an engine mounted to the front frame.

20. The agricultural tractor of claim 7, further including a transmission mounted to the middle frame.

21. The agricultural tractor of claim 20, wherein the first and second front ground-engaging suspensions are driven by the transmission.

22. The agricultural tractor of claim 20, wherein the first and second rear ground-engaging suspensions are driven by the transmission.

* * * * *